United States Patent
Silvennoinen

(10) Patent No.: US 6,460,472 B1
(45) Date of Patent: Oct. 8, 2002

(54) FLUIDIZED BED MATERIAL, METHOD FOR ITS PRODUCTION, AND METHOD IN A FLUIDIZED BED PROCESS

(75) Inventor: Jaani Silvennoinen, Tampere (FI)

(73) Assignee: Kvaerner Pulping Oy, Tampere (FI)

( * ) Notice: Subject to any disclaimer, the term of this patent is extended or adjusted under 35 U.S.C. 154(b) by 0 days.

(21) Appl. No.: 09/674,094

(22) PCT Filed: Apr. 30, 1999

(86) PCT No.: PCT/FI99/00357

§ 371 (c)(1),
(2), (4) Date: Oct. 26, 2000

(87) PCT Pub. No.: WO99/57488

PCT Pub. Date: Nov. 11, 1999

(30) Foreign Application Priority Data

Apr. 30, 1998 (FI) .................................................. 980964

(51) Int. Cl.$^7$ ............................................... F23G 5/00
(52) U.S. Cl. ................. 110/243; 110/244; 110/245; 110/341; 110/346; 110/347
(58) Field of Search .................. 110/243, 244, 110/245, 346, 341, 342, 347

(56) References Cited

U.S. PATENT DOCUMENTS

| 4,075,953 | A | | 2/1978 | Sowards |
| 4,159,682 | A | | 9/1986 | Fitch et al. |
| 4,702,896 | A | * | 10/1987 | Mair ........................... 423/167 |
| 4,801,563 | A | * | 1/1989 | White ........................... 501/85 |
| 4,834,003 | A | * | 5/1989 | Reischl et al. ............... 110/346 |
| 4,899,695 | A | | 2/1990 | Brian et al. |
| 4,942,673 | A | | 7/1990 | Dellinger |
| 4,968,325 | A | | 11/1990 | Black et al. |
| 5,989,308 | A | * | 11/1999 | Kepplinger et al. .......... 75/436 |

OTHER PUBLICATIONS

James D. Dana, Manual of Mineralogy, Twentieth Edition, John Wiley & Sons, pp. 480–483 and 505–508.

FBC–Technology of Choice, Proceedings of 13$^{th}$ International Conference on Fluidized Bed Combustion, vol. 1, 1995, pp. 515–522.

* cited by examiner

Primary Examiner—Denise L. Ferensic
Assistant Examiner—K. B. Rinehart
(74) Attorney, Agent, or Firm—Swidler Berlin Shereff Friedman LLP

(57) ABSTRACT

A fluidized bed material including mineral particles of a gabbro class or darker rock type. The rock type includes several minerals and having a quartz content of 5 wt-% or less. The particles are made by comminuting a gabbro class or darker rock type. A fluidized bed process including performing a reaction or a processing of a material in a fluidized bed reaction in connection with the fluidization of a fluidized bed material, wherein the fluidization bed material includes particles of the gabbro class or darker rock type.

14 Claims, 2 Drawing Sheets

FLUIDIZED BED MATERIAL, METHOD FOR ITS PRODUCTION, AND METHOD IN A FLUIDIZED BED PROCESS

The invention relates to a fluidized bed material which consists of a particulate mineral material. The invention relates also to a method for producing a fluidized bed material, as well as to a method in a fluidized bed process.

In fluidized bed processes, fluidized bed material in the form of mineral particles is used in connection with a reaction, such as a combustion reaction, taking place in a fluidized bed reactor, or in connection with material processing. The fluidized bed material forms a solid fluidized phase in the reaction or in the material processing, and its aim is to be inert and to stabilize the reaction conditions, such as the process of combustion. In combustion reactions, a solid material reactive under combustion conditions is also often added, such as limestone particles to adsorb sulphur.

In fluidized bed combustion, natural sand is presently used as the inert fluidized bed material, due to its easy availability. Sand contains primarily the following minerals, the contents varying as follows: quartz ($SiO_2$) 25–70%, plagioclase ($NaAl\ Si_3O_8 + Ca\ Al\ Si_3O_8$) 20–50%, and potash feldspar ($KAlSi_3O_8$) 10–30%. The percentage contents of the above minerals vary to a great extent according to the locations and conditions of formation of the sand.

The fuels used in fluidized bed boilers produce alkaline ash. When mineral quartz (so-called free quartz) contained in natural sand reacts with the alkali metals in the ashes of the fuel, it produces a gummy substance which acts like an adhesive between the particles of the bed material. This adhesive substance impedes the fluidizing by causing agglomeration of particles, and in the worst case it may cause the development of a whole solid sinter deposit.

The mechanism of agglomeration described in the paragraph above is only one possibility. Another possibility with ash-rich and alkali-rich fuels is a situation, in which ash melt is produced in such large quantities that adhesion takes place for physical reasons. Thus, the chemical reactions taking place on the surface of a particle of the fluidized bed material have no significance. The mechanisms leading to bed agglomeration are complex and at present insufficiently known.

Gasification and combustion of biomass by means of a hot fluidized sand bed is known e.g. from U.S. Pat. No. 4,968,325. U.S. Pat. No. 4,159,682, in turn, discloses predrying of a wet organic material to be combusted. The predrying takes place by fluidization with hot sand supplied from a fluidized bed boiler.

Because of the risk of sintering of the fluidized bed material in fluidized bed boilers, preventive measures must be taken that must be considered already in the design of the boiler construction. Thus, e.g. U.S. Pat. No. 4,942,673 discloses a device for preventing sintering, installed in the intermediate storage receptacle of the fluidized bed boiler.

Another way of preventing sintering is to supply the fluidized bed boiler with additives, which are usually metal oxides or substances producing them by decomposition, for the purpose of raising the melting point of the ash. The supply of the additive requires knowledge on the ash and right proportioning of the additive.

There is no unambiguous definition for a difficult fuel. In view of controlling the bed, a fuel is made difficult by its ash content (quantity of ash) and the composition of the ash produced. In the ash of a fuel, problematic for bed sintering are potassium (K), sodium (Na), sulphur (S), chlorine (Cl), and silicon (Si). In fluidized bed combustion, difficult fuels in view of bed agglomeration include e.g. different agricultural waste (straws and other fractions of different grains, almond shells, marc from olive oil), plywood, various animal excrements.

It is an aim of the present invention to present a fluidized bed material which has a considerably smaller risk of sintering and which can be used in the combustion of a variety of fuels, including difficult fuels, wherein additives are not necessarily needed. For attaining this aim, the material is primarily characterized in what will be presented in claim 1.

According to the invention, natural sand which is normally used in the fluidized bed reactor, is replaced by a quarried rock or mineral whose maximum free quartz content is 10 wt-%, preferably very small (<0.1%). The definition includes naturally also all rock types or minerals containing no quartz at all. In this context, quartz refers to mineral quartz.

According to an established definition, rock types are natural mineral accumulations of certain composition and structure in the bedrock. Rock types are composed of sometimes one but usually several minerals whose grains are more or less tight joined to each other. Rock types do not have clear boundaries, because the ratios and occurrences of different minerals can vary within one and the same rock type. The term mineral refers in this context to a rock which is obtained from a natural deposit, consists primarily (more than 90–95 vol-%) of one mineral and may have small contents of accessory minerals. Thus, the terms rock type and mineral are not concepts that exclude each other in this context. Also minerals occurring in pure form in natural deposits are included in the scope of the invention.

It is also an aim of the invention to present a method for producing a fluidized bed material. In accordance with the invention, the method is characterized in what will be presented in the characterizing part of the appended claim 7. The fluidized bed material is produced in a suitable process by comminuting a natural rock type or mineral whose quartz content is suitably low or which is devoid of quartz. Thus, it is possible to select a material suitable for the fluidized bed process from a variety of possible rock types or minerals, and to grind the raw material to a suitable particle size, from which a fraction of suitable size can be separated by sieving.

It is also an aim of the invention to present a new fluidized bed process. The fluidized bed process is characterized in what will be presented in the characterizing part of the appended claim 13.

BRIEF DESCRIPTION OF THE DRAWINGS

In the following, the invention will be described in more detail with reference to the appended drawings, in which

FIGS. 1 and 2 show a fluidized bed reactor with a reactor chamber 1 which is limited at the bottom by a structure 2 for distributing fluidizing air, having nozzles, known as such, which direct an air flow upwards for bringing the bed material M consisting of inert particles of solid matter in the chamber into a fluidized state to form a fluidized bed. The material to be processed is supplied into the fluidized bed from an inlet 3. Exhaust gases are discharged via an outlet 4 in the upper part of the chamber. Supplementary air 8 is introduced at one or several levels.

FIG. 1 shows a bubbling fluidized bed (BFB) reactor, and FIG. 2 shows a circulating fluidized bed (CFB) reactor. In the latter, the bed material is circulated in such a way that the solid particles flown with the exhaust gases are separated in a particle separator 5, from which they can be returned to the reactor chamber 1, close to its bottom, via a return duct 6. In both reactor types, there is a discharge hopper 7 for the material of the fluidized bed underneath the distribution structure 2.

Figure 2:
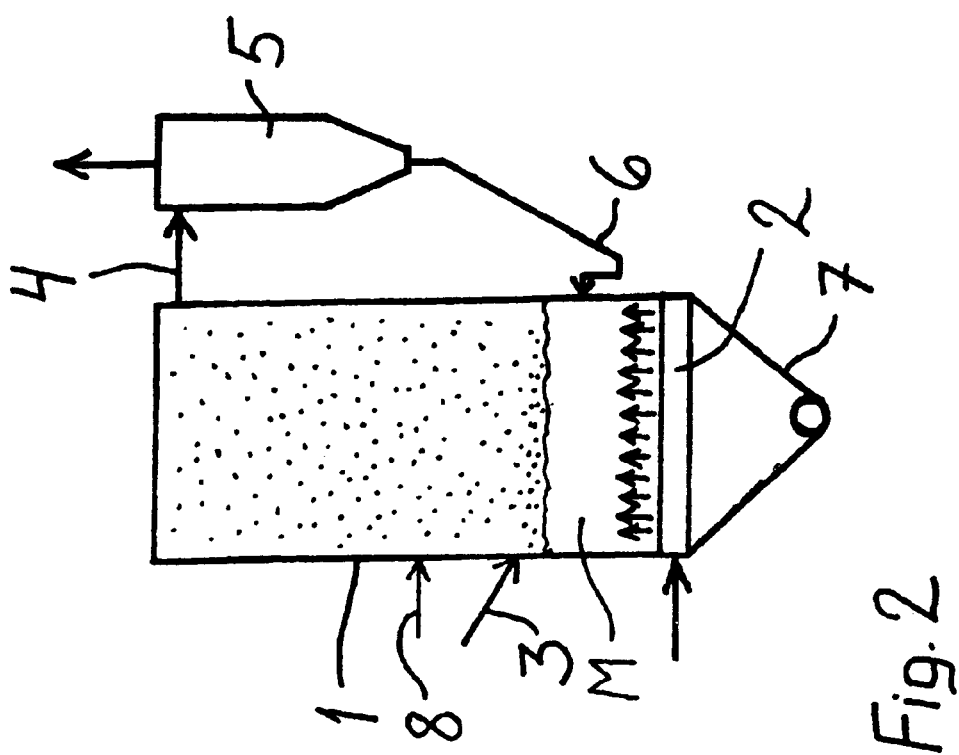
FIGS. 1 and 2 show, in schematic view, fluidized bed processes in which the new fluidized bed material can be utilized.
Figure 1:
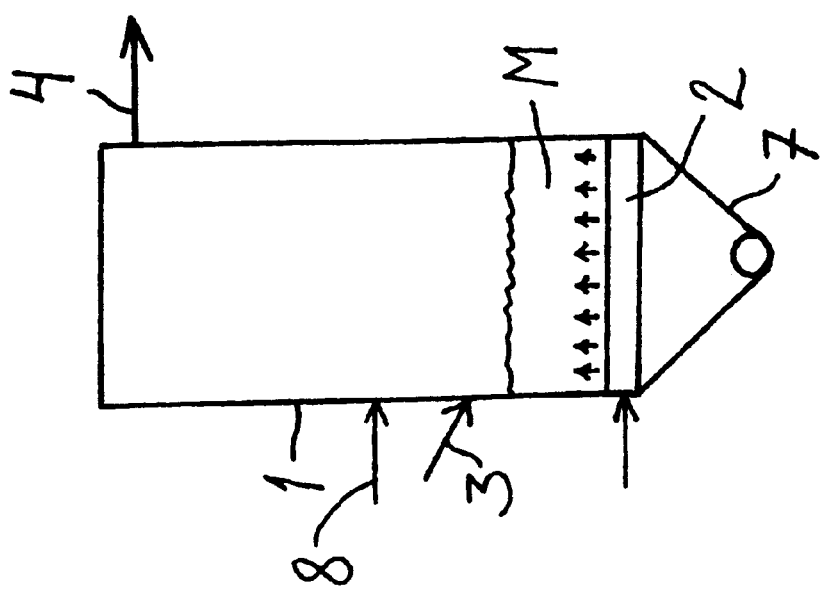

Fluidized bed reactors complying with these layouts are used for the combustion of solid fuels, wherein the reactor is a heat producing fluidized bed boiler. The walls of the reactor chamber, i.e. the combustion chamber, are thus equipped with heat transfer tubes for the transmission of the combustion heat into a heat carrier flowing in the tubes. The fuel is supplied from the inlet 3, and the fluidization air acts as the combustion air. Secondary air can also be supplied to the combustion chamber.

The layouts presented above are simplified representations of a fluidized bed reactor, and they only serve to illustrate the field of use of the bed material. The fluidized bed boiler can operate on known principles, i.e. it can be e.g. a bubbling fluidized bed reactor or a circulating fluidized bed reactor.

Sand, which is conventionally used as the bed material, is replaced by particles of a rock type or mineral with a low quartz content. The rock type or mineral should be such that its structure is not harmfully changed by the action of temperature, and it should be inert under combustion conditions; for example, it should not react with alkaline ash. The rock type or mineral has thus a low quartz content, i.e. a maximum of 10 wt-%. The maximum quartz content is advantageously 5 wt-% and preferably 1 wt-%. An ideal alternative is a case in which the maximum content is 0.1 wt-% or there is no quartz present.

Furthermore, the rock type or mineral should be such that if it contains mineral components of the feldspar group, it contains little alkali feldspar, such as potash feldspar. The maximum content of this feldspar component is advantageously 10 wt-%, more advantageously 5 wt-% and preferably 1 wt-%. In a preferred embodiment, the feldspar component, if present, is primarily (more than 90 vol-% of the total quantity of the feldspar components) or solely plagioclase feldspar. Rock types or minerals containing no components of the feldspar group are also included within the scope of the invention.

According to the most preferred embodiment, the rest of the mineral components in addition to quartz and/or the components of the feldspar group are other rock-forming silicate minerals, or they constitute almost solely the rock type or mineral, when there are no silica and feldspar components present. These other rock-forming silicate minerals include particularly "dark-coloured minerals", i.e. mafic minerals of the type biotite, amphiboles, pyroxenes, and olivine. These minerals are used for defining the colour index of rock types, i.e. the colour index (darkness) of the rock type is their percentage, by volume, of the minerals of the rock type (Manual of Mineralogy, after James D. Dana, 20th edition, John Wiley & Sons 1985). Several "dark-coloured" rock types are known which contain one or several of the above-mentioned dark-coloured minerals and less than 5 wt-% quartz.

In addition to the above-mentioned other rock-forming silicate minerals, the rock type may contain small quantities of ore minerals, such as magnetite and ilmenite, as side minerals, so-called accessories.

Particular examples on the rock types in question include rocks of a so-called gabbro class or rocks darker than it. These rocks belong to igneous rocks. These rocks and the minerals contained in them are basic, have crystallized from melt magma in various depths in the earth crust, and they can be divided into the following groups:

dark plutonic rocks (gabbro, diorite, peridotite, pyroxenite, dunite, hornblende, pyroxene, olivine)

dark hypabyssal rocks or dike rocks (diabase, dolerite)

extrusive or supracrustal rocks (basalt)

The alternative bed material made of the above-mentioned rock types/minerals resists better the attack of alkali metals in ash.

Rock types belonging to other groups than igneous rock types can also be used, if their mineral composition is suitable for use in a fluidized bed.

One feasible rock type is diabase. Diabase can be quarried in different parts of Finland, and rock types of corresponding quality are found in the whole area of the earth. Diabases are dike rocks crystallized in the upper parts of the earth crust and containing 25 to 65% dark minerals and 30 to 70% plagioclase. The structure of the rock types is strong, which is due to a durable ophitic texture. In the ophitic texture, lath-shaped plagioclase grains positioned at random constitute a durable network structure, other minerals being placed tightly in the interspaces thereof. The thermal conductivity of the mineral is good, and it resists well the stress caused by temperature gradients. Diabase is used e.g. in earthworks, as a raw material in asphalt industry, as gravestones, and as rocks in a Finnish sauna stove.

The particle density of diabase ranges from 2900 to 3100 $kg/m^3$, whereas it is ca. 2700 in natural sand. The bulk density is slightly greater (ca. 1600 to 1800 $kg/m^3$) as in sand (1500 $kg/m^3$). The particle shape is considerably more out-of-round than in natural sand. On the basis of what is presented above, it can be assumed that the fluidizing properties are equal to those of sand with a similar particle size distribution. The hardness of diabase on Mohs' scale is approximately 6.5, which is a slightly higher value than with natural sand. The Mohs' scale is based on scratching hardness, wherein the materials to be tested are arranged in a descending order after diamond. The scale is logarithmic.

For example, diabase obtained from Eurajoki, Finland, contains the following minerals (given as percentage contents obtained by X-ray diffraction, XRD):

| | |
|---|---|
| Plagioclase | 50% |
| Pyroxene | 25% |
| Olivine | 15% |
| Biotite | 6% |
| Magnetite | 4% |

The rock is quarried, crushed and sieved to the desired particle size (e.g. 500 to 1200 $\mu$m for a fluidized bed reactor).

In view of chemical and mineral analysis, the greatest difference between the material of the invention and natural sand lies in the quartz content. All quartz-free minerals (olivine, pyroxenes, plagioclase) function better than quartz-containing natural sand in the combustion of difficult alkali-containing fuels.

It should also be noted that whereas sand contains a considerable quantity of K-feldspar, in the rock types used a minimum of 90 vol-% of the feldspar component (if it is present) is plagioclase feldspar.

The colour of the alternative material is clearly darker, and it has considerably different high-temperature properties in comparison with natural sand.

By means of the invention, it is possible to increase the fuel flexibility of the fluidized bed boiler in combustion processes. The invention facilitates the fluidized bed combustion of fuels with a high alkali content.

Such difficult fuels are processed e.g. in plants for the combustion of organic waste, such as waste from a plywood factory, poultry excrements, or marc from olive oil.

The invention will be described in the following experimental section which does not restrict the invention.

Test runs of bed material

1. Introduction

Test runs were made with a fluidized bed reactor having a reactor pipe with an inner diameter of 42 mm and length of approximately one metre. During the test, temperatures were monitored at five different heights in the reactor pipe. The temperature measurement was made with thermoelements. Furthermore, the pressure difference over the fluidized bed was monitored with a U-tube pressure gauge. With the pressure gauge, the fluidization of the bed could be monitored. The thickness of the bed in a cold state was ca. 14 cm, which corresponds to approximately 2 decilitres of bed material.

2. Aim

The aim of the test runs was to compare different bed materials. The fuel was plywood cutting waste (the term plywood waste will be used hereinbelow). Plywood ash contains large quantities of alkali metals which may, upon reacting with the bed material or other components of the fuel, produce compounds melting at a low temperature. The resulting melt adheres to sand particles. In the worst case, such large agglomerated regions develop in the fluidized bed that the boiler must be run down because of disturbances in the fluidization.

3. Fuel

Essential data on the plywood waste and the ash contained therein are given below.

TABLE 1

|  | Plywood waste |
|---|---|
| Ash content (% of dry matter) | 1.5 |
| $K_2O$ content in ash (%) | 5.9 |
| $Na_2O$ content in ash (%) | 35.05 |
| Effective thermal value (MJ/kg) | 20.7 |

4. Bed Materials

The bed materials tested and their substantial differences on the basis of a mineral analysis (ND=not detected) are given in a table below. The contents are percentage shares obtained by XRD analysis.

TABLE 2

| Mineral composition | Natural sand (Rudus) | Feldspar | Diabase A | Diabase B |
|---|---|---|---|---|
| Quartz (%) | 40 | 23 | <1 | <1 |
| K - feldspar (%) | 20 | 41 | ND | ND |
| Na - feldspar (%) | ND | 34 | ND | ND |
| Ca - feldspar (%) | ND | 2 | ND | ND |
| Plagioclase (%) | 40 | ND | 55,9–64,9 | 50 |
| Olivine (%) | ND | ND | 10,2–12,8 | 15 |
| Magnetite (%) | ND | ND | 5,9–6,5 | 4 |
| Pyroxene (%) | ND | ND | 2–11,5 | 25 |
| Biotite (%) | ND | ND | ND | 6 |

The olivine tested was an olivine mineral containing primarily the chemical elements given in the following table 3. $SiO_2$ in the olivine is calculated as silicon oxide; consequently, it is not mineralic quartz as in the table 2 above.

TABLE 3

Analysis of chemical elements in the olivine with range of variation

| $SiO_2$ (%) | 41,0–43,0 |
|---|---|
| $Fe_2O_3$ (%) | 6,5–7,5 |
| MgO (%) | 48,0–50,0 |

5. Test Run

Figure 3:
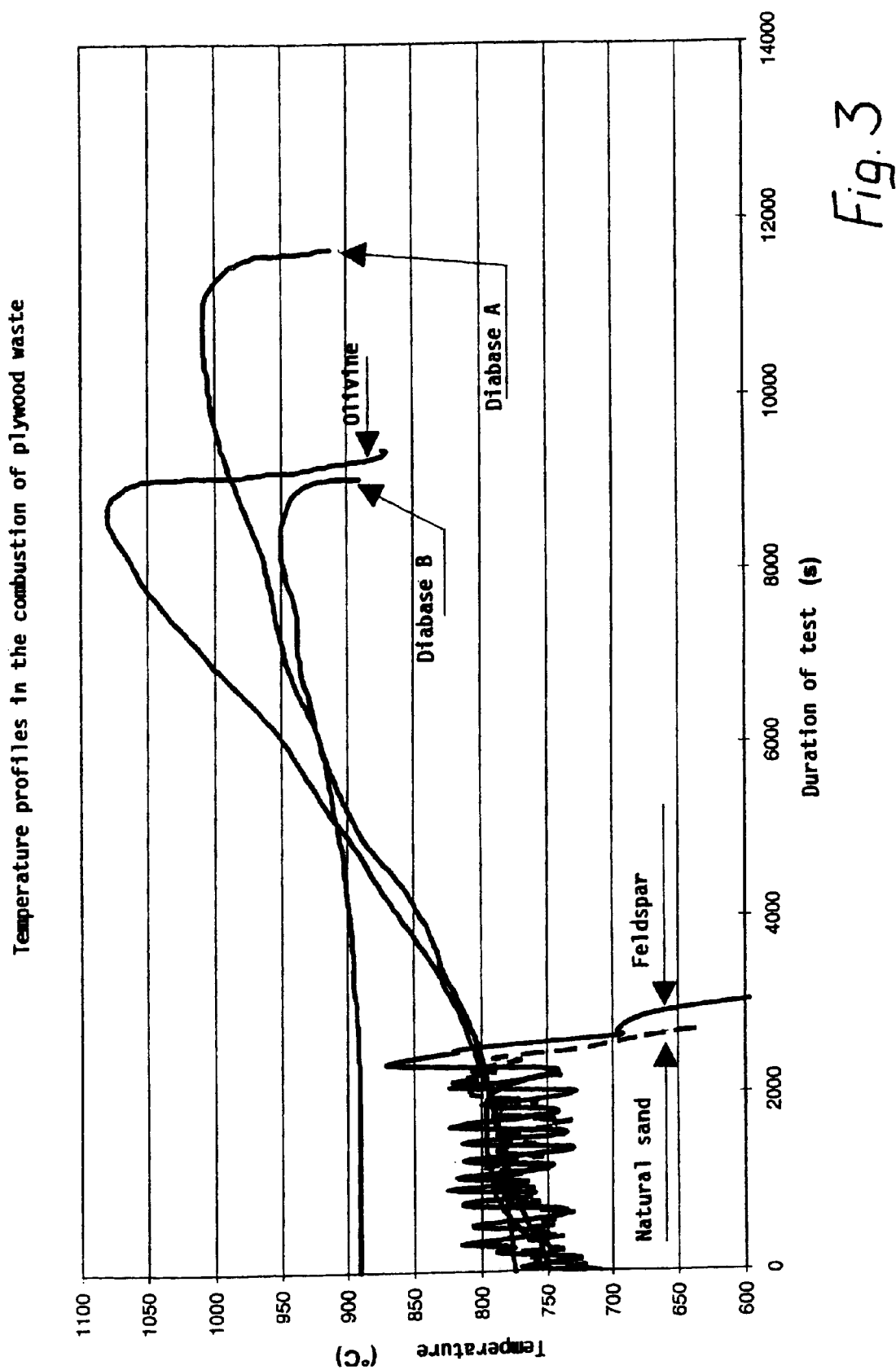
FIG. 3 shows the results obtained with different materials in test runs.

The appended FIG. 3 shows the temperature profiles of the uppermost thermoelement (ca. 15 cm from the surface of the grate) with different materials.

The curves show that different bed materials have different resistancies to the attack of alkali in the fuel ash. Natural sand, feldspar and olivine were stuck at some stage during the test run; on the other hand, olivine was considerably more resistant than the other two. This did not happen with diabases. With diabase B, the test run ended in trouble with data collection. With diabase A, the test run ended in a controlled termination after the desired test period.

It can be seen from the curves that natural sand and feldspar resisted for about 40 minutes without sintering. Olivine resisted for about 2 h 45 min without sintering, but with olivine the bed temperature was finally as high as 1100° C.

Both of the diabases resisted without sintering, diabase A for 3 h 33 min and diabase B for 2 h 36 min.

6. CONCLUSIONS

All quartz-free minerals (olivine, pyroxines, plagioclase) and rock types consisting primarily of them function better than quartz-containing natural sand in the combustion of alkali-containing fuels. They function also better than feldspar which is not suitable as a bed material in the combustion of difficult fuels.

Dark-coloured rocks function better than natural sand, because their quartz content is low or non-existent. The bed material contains thus no free quartz which could react with the alkali metals in the fuel ash.

What is claimed is:

1. A fluidized bed material, comprising:

mineral particles of a gabbro class or darker rock type, the rock type comprising several minerals and having a quartz content of 5 wt-% or less.

2. The fluidized bed material according to claim 1, wherein the rock type comprises plagioclase feldspar and at least one dark-colored rock-forming silicate minerals.

3. The fluidized bed material according to claim 1, wherein the rock type is diabase.

4. A method for producing a fluidized bed material, in which method mineral particles are obtained, the method comprising:

producing the particles by comminuting a gabbro class or darker rock type, said rock type comprising several minerals and having a quartz content of 5 wt-% or less.

5. The method according to claim 4, wherein the quartz content of the rock type is 1 wt-% or less.

6. The method according to claim 4, wherein the quartz content of the rock type is 0.1 wt-%.

7. The method according to claim 4, wherein the rock type comprises plagioclase feldspar and at least one dark-colored rock-forming silicate mineral.

8. The method according to claim 7, wherein the rock type is diabase.

9. The method according to claim 4, further comprising:
separating a suitable fraction from the particles by sieving after comminuting.

10. A method in a fluidized bed process, comprising:
performing a reaction or a processing of a material in a fluidized bed reaction in connection with the fluidization of a fluidized bed material, wherein the fluidized bed material comprises mineral particles of a gabbro class or darker rock type, said rock type comprises sever minerals and has a quartz content of 5 wt-% or less.

11. The method according to claim 10, wherein the rock type has a quartz content of 1 wt-% or less.

12. The method according to claim 10, wherein the rock type has a quartz content of 0.1 wt-% or less.

13. The method according to claim 10, wherein the fluidized bed process is a bubbling fluidized bed process.

14. The method according to claim 10, wherein the fluidized bed process is a circulating fluidized bed process.

* * * * *